(12) United States Patent
Fair et al.

(10) Patent No.: US 9,683,185 B2
(45) Date of Patent: Jun. 20, 2017

(54) SOLID FUEL PRODUCT

(71) Applicant: Z DUST GROUP, INC, Montevallo, AL (US)

(72) Inventors: Jeff Fair, Coopersburg, PA (US); Steve Dailey, Winter Spring, FL (US)

(73) Assignee: Z DUST GROUP, INC, Montevallo, AL (US)

( * ) Notice: Subject to any disclaimer, the term of this patent is extended or adjusted under 35 U.S.C. 154(b) by 0 days.

(21) Appl. No.: 15/226,274

(22) Filed: Aug. 2, 2016

(65) Prior Publication Data

US 2016/0340600 A1    Nov. 24, 2016

Related U.S. Application Data

(63) Continuation of application No. 15/052,777, filed on Feb. 24, 2016.
(Continued)

(51) Int. Cl.
*C10L 5/00* (2006.01)
*C10L 5/14* (2006.01)
(Continued)

(52) U.S. Cl.
CPC .... *C10L 5/14* (2013.01); *C10L 5/04* (2013.01); *C10L 5/361* (2013.01); *C10L 5/40* (2013.01); *C10L 5/406* (2013.01); *C10L 5/442* (2013.01); *C10L 9/10* (2013.01); *C10L 2290/06* (2013.01); *C10L 2290/141* (2013.01); *C10L 2290/24* (2013.01); *C10L 2290/32* (2013.01); *Y02E 50/10* (2013.01); *Y02E 50/30* (2013.01)

(58) Field of Classification Search
CPC .... C10L 5/14; C10L 5/406; C10L 5/04; C10L 5/442; C10L 5/40; C10L 5/361; C10L 2290/24; C10L 2290/06; C10L 2290/32; C10L 2290/141; C10L 9/10; Y02E 50/10; Y02E 50/30
USPC ........................................................ 44/600
See application file for complete search history.

(56) References Cited

U.S. PATENT DOCUMENTS

| | | |
|---|---|---|
| 2,017,402 A | 10/1935 | Komarek et al. |
| 2,076,315 A | 4/1937 | Albrecht |

(Continued)

FOREIGN PATENT DOCUMENTS

| | | |
|---|---|---|
| GB | 550167 | 12/1942 |
| GB | 881878 | 11/1961 |

(Continued)

OTHER PUBLICATIONS http://www.researchgate.net/publication/257781205_Physical_properties_of_solid_fuel_briquettes_from_bituminous_coal_waste_and_biomass.

*Primary Examiner* — Latosha Hines
(74) *Attorney, Agent, or Firm* — Richard C. Litman

(57) ABSTRACT

A solid fuel product can include a carbon based solid fuel, a cementitious material, and a plastic material. The carbon based solid fuel can include coal, petroleum coke, wood and/or other carbon products. The cementitious material can include Portland cement, lime, calcium aluminate cement, natural cement, slag cement, blended cement, cement kiln dust, lime kiln dust, and/or fly ash. The plastic material can include a thermoplastic material and/or a thermoset material. The solid fuel product can include about 45% by weight to about 98% by weight of the carbon based solid fuel and about 1% by weight to about 50% by weight of the plastic material.

1 Claim, 4 Drawing Sheets

Related U.S. Application Data

(60) Provisional application No. 62/128,942, filed on Mar. 5, 2015.

(51) Int. Cl.
    *C10L 5/40*     (2006.01)
    *C10L 5/04*     (2006.01)
    *C10L 5/44*     (2006.01)
    *C10L 9/10*     (2006.01)
    *C10L 5/36*     (2006.01)

(56) References Cited

U.S. PATENT DOCUMENTS

| | | |
|---|---|---|
| 4,167,398 A | 9/1979 | Hughes et al. |
| 4,270,447 A | 6/1981 | Gregorovic |
| 5,487,764 A | 1/1996 | Ford, Jr. |
| 5,641,847 A | 6/1997 | Hozumi et al. |
| 5,807,420 A | 9/1998 | Eatough et al. |
| 6,165,238 A * | 12/2000 | Parkinson .............. C10L 5/08 44/553 |
| 2001/0013197 A1 | 8/2001 | White |
| 2008/0110083 A1 | 5/2008 | Baehr et al. |

FOREIGN PATENT DOCUMENTS

| | | |
|---|---|---|
| GB | 974437 | 11/1964 |
| GB | 1046250 | 10/1966 |
| GB | 1059679 | 2/1967 |
| GB | 2 330 150 A | 4/1999 |
| JP | 57025393 A | 2/1982 |
| JP | 57135893 A * | 8/1982 |
| RU | 2 259 389 C1 | 8/2005 |
| RU | 2259389 C1 * | 8/2005 |

* cited by examiner

SOLID FUEL PRODUCT

CROSS-REFERENCE TO RELATED APPLICATIONS

This application is a continuation of prior application Ser. No. 15/052,777, filed Feb. 24, 2016, which claims the benefit of U.S. Provisional Patent Application Ser. No. 62/128,942, filed Mar. 5, 2015.

BACKGROUND OF THE INVENTION

1. Field of the Invention

The present invention generally relates to solid fuels, and, more particularly, to fuel briquettes designed to reduce emissions, improve handling, and/or increase the heat value of carbon based solid fuels.

2. Description of the Related Art

Industrial fuels, especially coal and wood, are susceptible to degradation from exposure to natural elements. These fuels can lose significant heat value when their moisture content increases. Wood is especially susceptible to losing heat value because wood reabsorbs moisture from the surrounding environment very soon after it is dried. Retaining the heat value of such fuels becomes even more difficult during cold temperatures, as the fuels are susceptible to freezing. Further, the elements, such as wind, can adversely impact the storage of these industrial fuels. For example, wind can spread coal into the environment. Many conventional technologies for controlling heat value losses are not only expensive but also harmful to the environment, since the technologies themselves require additional energy to operate.

There have been many attempts to improve the utilization of plastics as a source of heat in our environment. Although plastics, as fuel, have great potential to act as a heat source, to date there has been limited success in using plastics as a heat source. Further, large industrial fuel plants cannot easily adapt to using plastics in high volume.

Despite being able to efficiently generate power for many additional years without major modifications and/or reconstruction, the tightening of air emission standards have rendered many small scale industrial plants, such as power generator stations, obsolete. The decline in these types of power generator stations can adversely impact the environment, as well as the economy in many localities. For example, small scale industrial plants are being replaced with larger power plants, thereby significantly increasing the greenhouse gases emitted into the atmosphere, which can contribute to global warming. Further, the large scale industrial power plants have to be built further away from urban centers because of their large sizes. This, in turn, can result in an increase in unemployment since the smaller power plants offer good employment opportunities in the more populated urban centers.

Unless small scale industrial power plants can be configured to utilize cleaner fuels, they risk becoming obsolete.

Thus, a solid fuel product solving the aforementioned problems is desired.

SUMMARY OF THE INVENTION

A solid fuel product can include a carbon based solid fuel, a cementitious material, and a plastic material. The carbon based solid fuel can include coal, petroleum coke, wood and/or other carbon products. The cementitious material can include Portland cement, lime, calcium aluminate cement, natural cement, slag cement, blended cement, cement kiln dust, lime kiln dust, and/or fly ash. The plastic material can include high density polyethylene (HDPE), low density polyethylene (LDPE), polypropylene (PP), polystyrene (PS), polyethylene terephthalate (PET), polyester, urea formaldehyde (UF), melamine urea formaldehyde (MUF), and/or phenol formaldehyde (PF). Preferably, the solid fuel product includes about 45% by weight to about 98% by weight of the carbon based solid fuel. Preferably, the solid fuel includes about 1% by weight to about 50% by weight of the plastic material.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
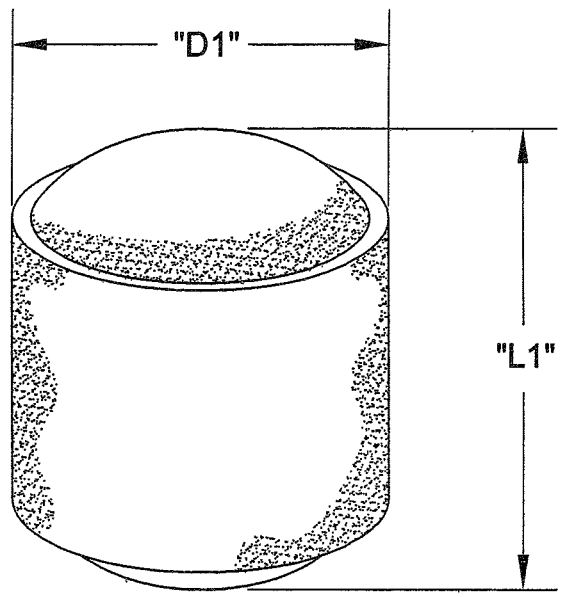
FIG. 1A is an environmental, vertical, side view of an embodiment of a solid fuel product, according to the present invention.

A solid fuel product can include a carbon based solid fuel, a cementitious material, and a plastic material. The carbon based solid fuel can include coal, petroleum coke, wood and/or other carbon products. The cementitious material can include Portland cement, lime, calcium aluminate cement, natural cement, slag cement, blended cement, cement kiln dust, lime kiln dust, and/or fly ash. The plastic material can include high density polyethylene (HDPE), low density polyethylene (LDPE), polypropylene (PP), polystyrene (PS), polyethylene terephthalate (PET), polyester, urea formaldehyde (UF), melamine urea formaldehyde (MUF), and/or phenol formaldehyde (PF). Preferably, the solid fuel product includes about 45% by weight to about 98% by weight of the carbon based solid fuel. Preferably, the solid fuel product includes about 1% by weight to about 50% by weight of the plastic material.

The solid fuel product can be used as fuel for industrial processes with high heat demand. Coal is one of the lowest cost industrial fuel sources. Accordingly, coal, especially less desirable coal or coal byproducts, can be a primary component of the solid fuel product. Many coals, coal by-products from coal mining, and/or coal cleaning have a high moisture content, which can lower the British thermal unit (Btu) per ton at the burner. The solid fuel product can improve the source coal's thermal value. The solid fuel product can be formulated to meet an end-user's Btu specifications. For example, as described in detail in the examples below, a Btu of the solid fuel product can be increased by reducing coal moisture and/or by adding materials with higher fuel value. Further, the solid fuel product can be more resistant to breakage and dusting (typically associated with coal storage and transport), thereby alleviating many plant operation problems.

The plastic material can facilitate reducing air and water discharge from plant sites. The plastic material can provide a more durable solid fuel product that can better endure conventional shipping and handling equipment than typical industrial fuel products. The plastic material can include a previously used plastic material, e.g. recycled plastics. As discussed herein, examples of suitable plastics include high density polyethylene (HDPE), low density polyethylene (LDPE), polypropylene (PP), and/or polystyrene (PS). The plastic material of the solid fuel product can include one or more secondary synthetic resins to provide improved heat value or other improved characteristics. Examples of suitable secondary synthetic resins include urea formaldehyde (UF), melamine urea formaldehyde (MUF), melamine-urea-phenol-formaldehyde (MUPF), phenol formaldehyde (PF), polymeric methylene di-isocyanate (PMDI), and styrene monomer (SM). The solid fuel product can include up to about 15% of the secondary synthetic resin.

The solid fuel product can further include suitable amounts of petroleum oils, waxes, greases, and other derivatives of petroleum and/or animal and plant fats oils or waxes. It should be understood that the coal can be bituminous, sub-bituminous and/or lignite coal. Further, coal fines, coal dust, wood, petroleum coke, or other high carbon products or byproducts can be used in addition to or instead of coal.

A method of making the solid fuel product can include chemically drying a carbon base material, such as coal, to form a chemically dried carbon base material. A cementitious material can be mixed with a carbon base material to form a homogenous mixture. The carbon base material can be dried by hydration reactions with the cementitious materials. The particular cementitious material selected can depend upon an end user's fuel specifications and needs, e.g., emission reductions, leaching characteristics, or other fuel design needs. High intensity mixers can be used for mixing the cementitious materials with the carbon base material. Heat can be added, e.g., to raise temperatures from about 50° C. to about 110° C., so as to accelerate the hydration reactions and create a "micro-balled" product. If drying needs to be accelerated further, additional heat can be added. It is to be noted that the "micro-balled" product dries more efficiently, flows easier, and remains evenly dispersed in the subsequent "plastic" phase of the process. It is preferable to achieve a moisture content of about 1% to about 3%. Low dosage rates of between about 1% and 5% by weight can be used to minimize mineral addition to the solid fuel product unless mineral additions benefit other emission outcomes. Some amount of plastic can be added during the mixer stage if necessary to enhance drying. A thermoset resin can be added at this stage to further utilize the exothermic heat of the hydration reaction, as well as provide a thermosetting catalyst. However, the addition of the thermoset resin must be timed to coincide with optimum moisture content to set characteristics for briquetting.

As discussed herein, the chemically dried carbon base material can be mixed with the plastic to form the plastic mixture. The plastic mixture can be heated in a heater/mixer, e.g., to temperatures of up to about 230° C., to form a hot plastic mixture and, subsequently, injected into a plastic injection mold machine or an extruder to manufacture briquette cylinders, at a suitable pressure to manufacture briquettes or pellets having desired characteristics, such as size, weight, and shape.

The carbon base material can be chemically dried through a hydration reaction caused by mixing the carbon base material with a cementitious material, such as Portland cement, lime, calcium aluminate cement, natural cement, slag cement, blended cement, cement kiln dust, lime kiln dust, and fly ash, as well as other byproducts or additives typically used to enhance hydration. The exact formulation, such as the type of cementitious material used, can be based on the requirements of the end user. The amount of coal in the solid fuel product can range from about 0% to about 98% by weight of the solid fuel product.

Any suitable mixer, extruder, or pelletizer can be used to mix the carbon base material with the cementitious material. For example, a Kercher Industries high shear mixer, extruder, or pelletizer can be utilized to mix the carbon base material with the cementitious material. The carbon base material and the cementitious material can be mixed at high intensity for thirty seconds and then at low intensity for an additional thirty seconds so as to produce an output, such as a "micro-balled" product. Extruded or pelletized "micro balls" can also be used. Heat from the hydration or from an external source, such as a Holo flite heating system, can be used to raise the temperature of the output, such as the "micro-balled" product, from this process to a temperature ranging from about 50° C. to about 110° C. The moisture content can be reduced most efficiently at higher temperatures.

Any suitable insulated container, such as an insulated container bin having a design similar to a cement block kiln, can be used to store the output from the mixer. It is to be noted that the heat of the insulated containment bin can be regulated by venting the insulated container bin thermostatically, such as at 110° C., for example.

Any suitable heater/mixer for plastics, can be used to liquefy the plastic, and mix the output from the insulated containment bin with the liquefied plastic. Resins, including UF, MUF, MUPF, PF, PMDI, or other suitable plastic resins can also be added to the chemically dried carbon base material when at optimum moisture content to increase the heat value, as well as to achieve other desired fuel characteristics. Plastic encapsulation of the solid fuel product can produce durable, as well as water proof and/or water resistant solid fuel product. It is to be noted that the plastic component of the solid fuel product can be in the range of between 1% and 50% by weight of the solid fuel product. The plastic content can be varied depending on the desired fuel characteristics, such as Btu content, grind-ability, fuel nitrogen, sulfur, or mercury content of the solid fuel product. The temperature at which plastic can liquefy can vary depending on the type of plastic or plastic blends being used in the mixture.

Mixing the chemically dried material with liquefied plastic can help the solid fuel product attain various beneficial characteristics, such as lower air and water discharge from plant sites, as well as improved durability so as to withstand conventional shipping and handling equipment. The solid fuel product can be more resistant to water than pure coal or wood. For example, a solid fuel product with a plastic content greater than 15% by weight can be more durable than pure coal and can lead to less breakage in terms of transportation and storage.

A system for preparing the solid fuel product can include a heater/mixer (for heating plastics) and a plastic injection mold machine or an extruder for producing solid fuel products, in communicating relation with the heater/mixer.

The solid fuel product can be formulated to meet particular end user requirements not only for emissions, but also to meet handling requirements. With respect to size and shape, for example, the solid fuel product can be formed into pellets or briquettes, as desired. Similarly, the solid fuel product can be formulated to meet particular end user specifications with respect to exterior surface, e.g., in the range of between about 10 cm$^2$ and 80 cm$^2$, weight, in the range of between about 10 grams and 50 grams, Btu, moisture, target heat rate, specific fuel volatility content, ash content, specific sulfur content, nitrogen content, mercury content, and/or other specific fuel chemistry requirements (see Table). Other end user specifications can include a reduction in harmful emissions, improved operating combustion performance, improved fuel handling characteristics, improved leaching and run off, as well as improved plant efficiency. The product can be beneficial to the environment because it can include otherwise waste or unused byproducts and recyclable materials, such as recyclable plastic materials.

The various components of the solid fuel product, e.g., carbon based solid fuel, plastic material, and cementitious material, can be combined at a given temperature, pressure and/or time in order to enhance certain properties of the solid fuel product, e.g., durability and water resistance. The moisture content of the carbon based solid fuel can be controlled to enhance manufacturing and in particular to enhance durability and water resistance of the final product. The specific plastics and/or cementitious materials of the solid fuel product can be selected based on desired final product properties, such as, product density, dusting, angle of repose, spontaneous combustibility, and or other operational characteristics. The solid fuel product can be formulated to include available waste materials in environmentally responsible ways. Waste materials can include, but are not limited to, utility coal stockpile dregs and run off, waste coke dust, or other similarly unused high carbon waste residuals. These can also include underutilized MSW components or construction and demolition (C&D), including wood, plastics, bitumen, asphalt, etc. This solid fuel product can be formulated to make use of these problematic materials at appropriate combustion sites.

Example 1

Bituminous coal having a heat value of approximately 9,000 Btu's per pound and a moisture content of 19% was used to prepare a solid fuel product having a heat value of approximately 12,000 Btu's per pound along with a high durability and water resistance, as per an end user's specifications.

To formulate the desired bituminous coal so as to meet the end user's specifications, the bituminous coal was chemically dried, such as by mixing the bituminous coal with less than 5% by weight of Type 1 Portland cement in the mixer. The bituminous coal was mixed with the Portland cement at high intensity for approximately thirty seconds and then at low intensity for an additional thirty seconds so as to produce the output. The output was discharged into the heater where the discharge was heated to a suitable temperature, such as approximately 100° C. The product was then discharged and stored in the insulated containment bin, where the heat of the insulated containment bin was regulated by venting thermostatically at 110° C., for example.

The output was contained within the insulated containment bin for approximately twenty-four hours, after which testing revealed a moisture content of less than 4% and a heat value of approximately 10,500 Btu's per pound.

Figure 1B:
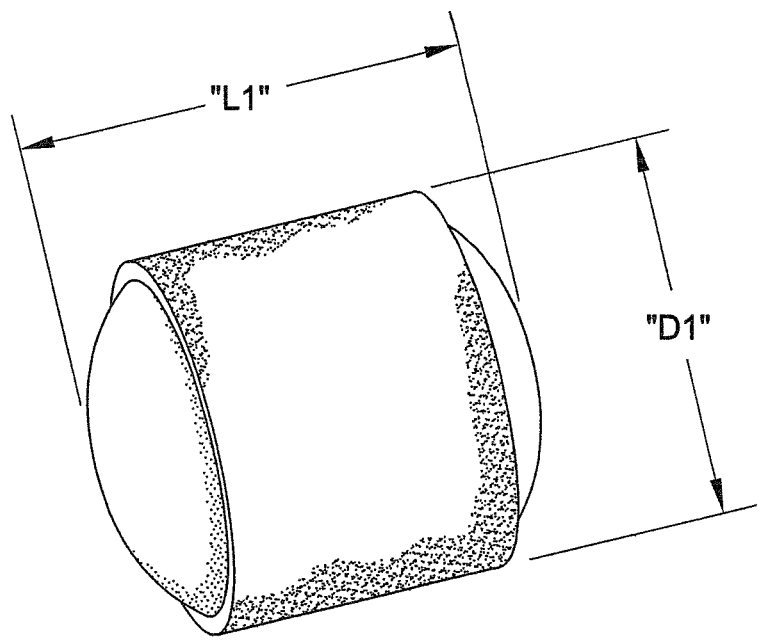
FIG. 1B is an environmental, horizontal, side view of an embodiment of a solid fuel product, according to the present invention.
Figure 2:
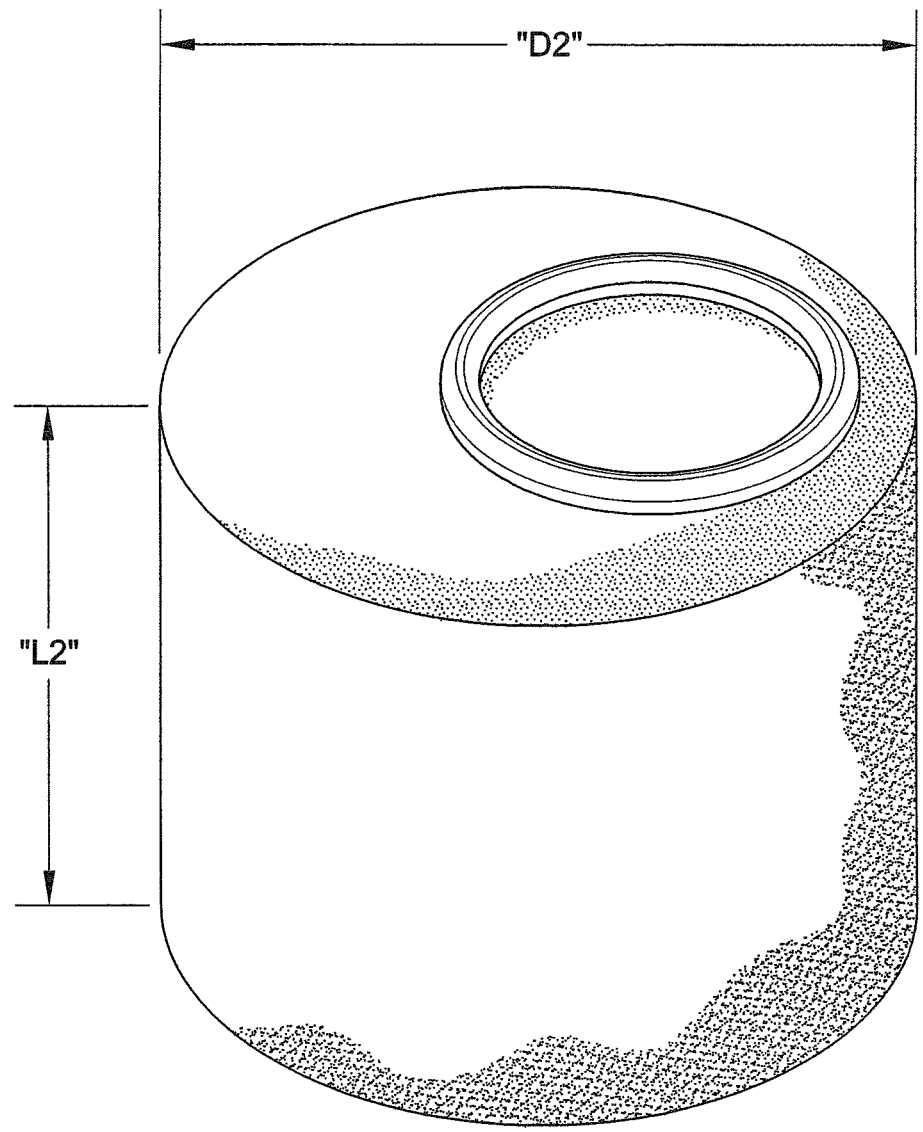
FIG. 2 is a top, perspective view of an embodiment of a solid fuel product, according to the present invention.

Subsequently, the output, after being removed from the insulated containment bin, was mixed with 10% HDPE in the heater/mixer having a pressurized temperature that can reach approximately 230° C. The heated material was then inserted into the plastic injection mold machine or the extruder, to manufacture briquette cylinders at a pressure of approximately 8,000 psi so as to manufacture multiple briquettes having a diameter, such as diameter D1 and diameter D2, of one inch and a length, such as length L1 and length L2, of one inch, as illustrated in FIGS. 1A, 1B, and 2.

After the process, a test of the solid fuel product indicated a heat value of approximately 12,500 Btu's per pound, less than a 0.01% moisture gain after a twenty-four hour soak in distilled water, and less than a 0.1% weight loss due to breakage after being dropped fifty feet, see Table.

Example 2

Sub-bituminous coal having a heat value of 8,500 Btu's per pound and a moisture content of 27.5% was used to prepare a solid fuel product having a reduced moisture content, such as for improved operating efficiency, and a lower dust release in storage and handling systems. The Btu limit was extended to approximately 13,500 Btu's per pound. The solid fuel product was formulated to meet the end user's preference for better water absorption resistance.

To formulate the desired sub-bituminous coal so as to meet the end user's specifications, the sub-bituminous coal was chemically dried by mixing the sub-bituminous coal with less than 5% by weight of Type 1 Portland cement in the mixer. The sub-bituminous coal was mixed with the Portland cement at high intensity for approximately thirty seconds and then at low intensity for an additional thirty seconds so as to produce the output. The mixer output was then discharged into the heater where the discharge was heated to a suitable temperature, such as approximately 75° C. The product was then discharged and stored in the insulated containment bin, where the heat of the insulated containment bin was regulated by venting thermostatically at 85° C., for example.

The output was contained within the insulated containment bin for approximately twenty-four hours, after which testing revealed a moisture content of less than 14% and a heat value of approximately 10,000 Btu's per pound.

Figure 3:
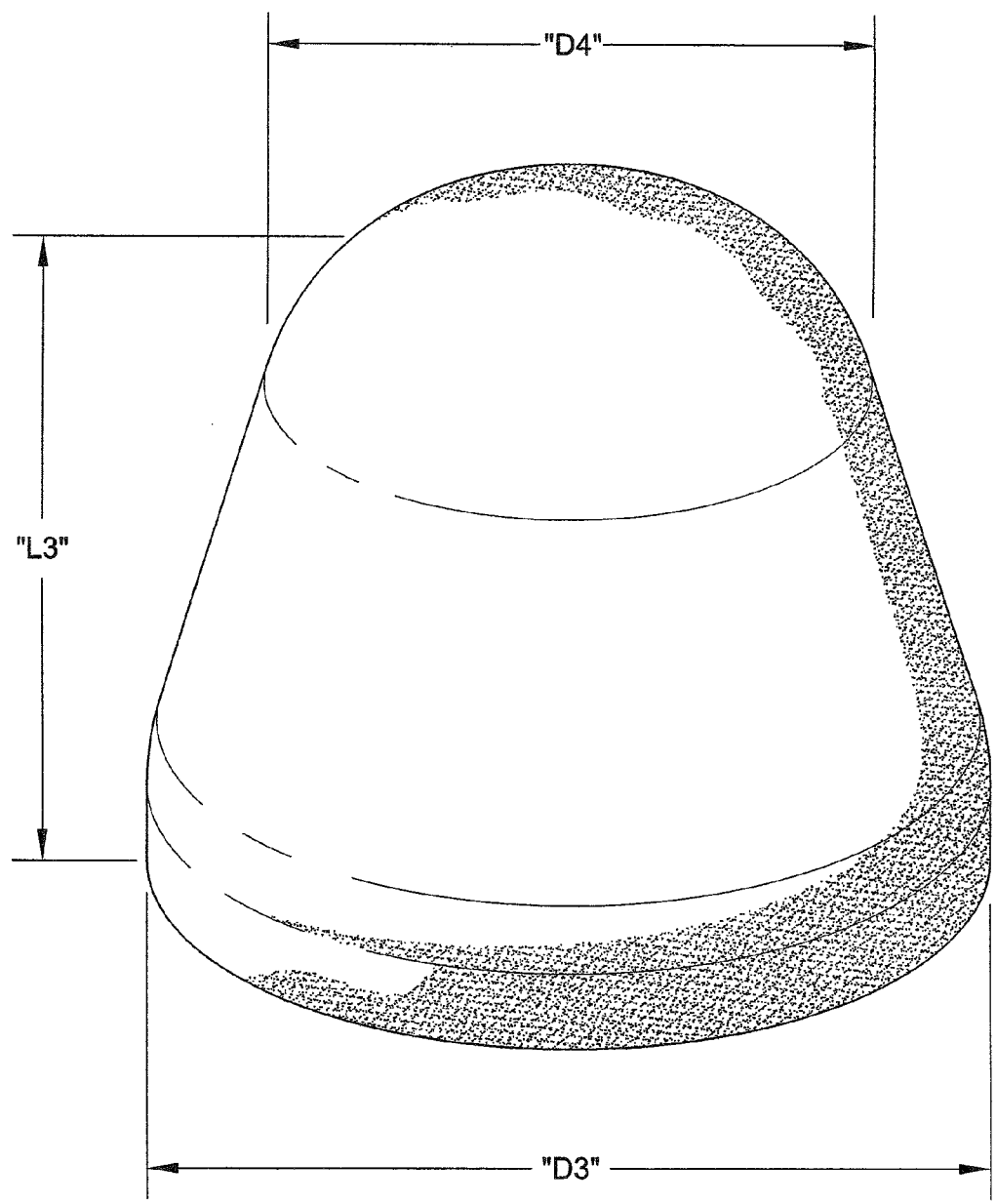
FIG. 3 is a top, perspective view of another embodiment of a solid fuel product, according to the present invention.

The output, after being removed from the insulated containment bin, was mixed with 25% HDPE in the heater/mixer, having a pressurized temperature that can reach approximately 210° C. The heated material was then inserted into the plastic injection mold machine or the extruder to manufacture briquette cylinders at a pressure of approximately 4,000 psi so as to manufacture multiple pellets having a first diameter, such as diameter D3, of ½ an inch and a second diameter, such as diameter D4, of ¾ of an inch, as well as a length, such as length L3, of about an inch, for example, as illustrated in FIG. 3.

After the process, a test of the solid fuel product indicated a heat value of approximately 12,000 Btu's per pound, less than a 0.1% moisture gain after a twenty-four hour soak in distilled water, and less than 0.05% weight loss due to breakage after being dropped from fifty feet. Additional testing included crushing both the source sub-bituminous coal and the solid fuel product less than a ¼ of an inch. After being crushed, one pound of the crushed source sub-bituminous coal and one pound of the solid fuel product were placed in a forced convection over air stream and it was determined that the weight loss of the solid fuel product was significantly less than ½ of the weight loss of the source sub-bituminous coal after twelve hours, see Table.

Example 3

Construction and Demolition (C&D) wood debris having a heat value of 7,100 Btu's per pound, at a moisture content of approximately 15% was used to prepare a solid fuel product having a heat value of approximately 8,600 Btu's per pound. This product was targeted for a small stoker bed boiler that failed to operate with wet biomass handling related problems. Unlike those wood chips, the briquettes formed according to the present teachings showed less than a 1% moisture gain after outdoor storage of more than thirty (30) days, less than a 2.0% moisture gain after a twenty-four hour soak in distilled water, and less than a 0.01% weight loss due to breakage after being dropped from fifty feet, as per an end user's specifications, see Table.

To prepare the solid fuel product so as to meet the end user's specifications and cost requirements, the locally available C&D wood was screened mechanically and magnetically before passing through a chipper with a ⅜ inch round hole screen. The C&D wood was heated and dried to approximately 8% moisture content and then mixed with approximately 5% (65% solids) liquid MUF resin. This material was then pelletized into ½" diameter pellets having a length of less than 1 inch.

Subsequently, the pellets were discharged and stored in the insulated containment bin, where the heat of the insulated containment bin was regulated thermostatically at 110° C., for example.

After the process, a test of the solid fuel product indicated a heat value of approximately 8,600 Btu's per pound, less than a 0.5% moisture gain after a twenty-four hour soak in distilled water, and less than 0.01% weight loss due to breakage after being dropped fifty feet, see Table.

Example 4

Bituminous coal having a heat value of 9,000 Btu's per pound and a moisture content of 19% was combined with wood chips having a heat value of approximately 4,000 Btu's per pound and a moisture content of 56% to prepare a solid fuel product having its sulfur and/or mercury emissions reduced by 40% along with its NOx emissions reduced by at least 20% compared to the source coal, as per an end user's specifications.

To prepare the solid fuel product so as to meet the end user's specifications, the bituminous coal was chemically dried by mixing the bituminous coal with less than 2% general purpose calcium aluminate cement in the mixer. It is to be noted that the cement can have a specific chemical formula based on the desired outcome. For example, the chemical formula of the cement can include a calcium aluminate content greater than 50% and less than 0.5% sodium and potassium oxides. The bituminous coal was mixed with the general purpose calcium aluminate cement at high intensity for approximately thirty seconds and then at low intensity for an additional thirty seconds so as to produce an output, such as a "micro-balled" product. The mixer output was then discharged into the heater where the discharge was heated to a suitable temperature, such as approximately 100° C. The product was then discharged and stored in the insulated containment bin, where the heat of the insulated containment bin was regulated by venting thermostatically at 110° C., for example.

Figure 4:
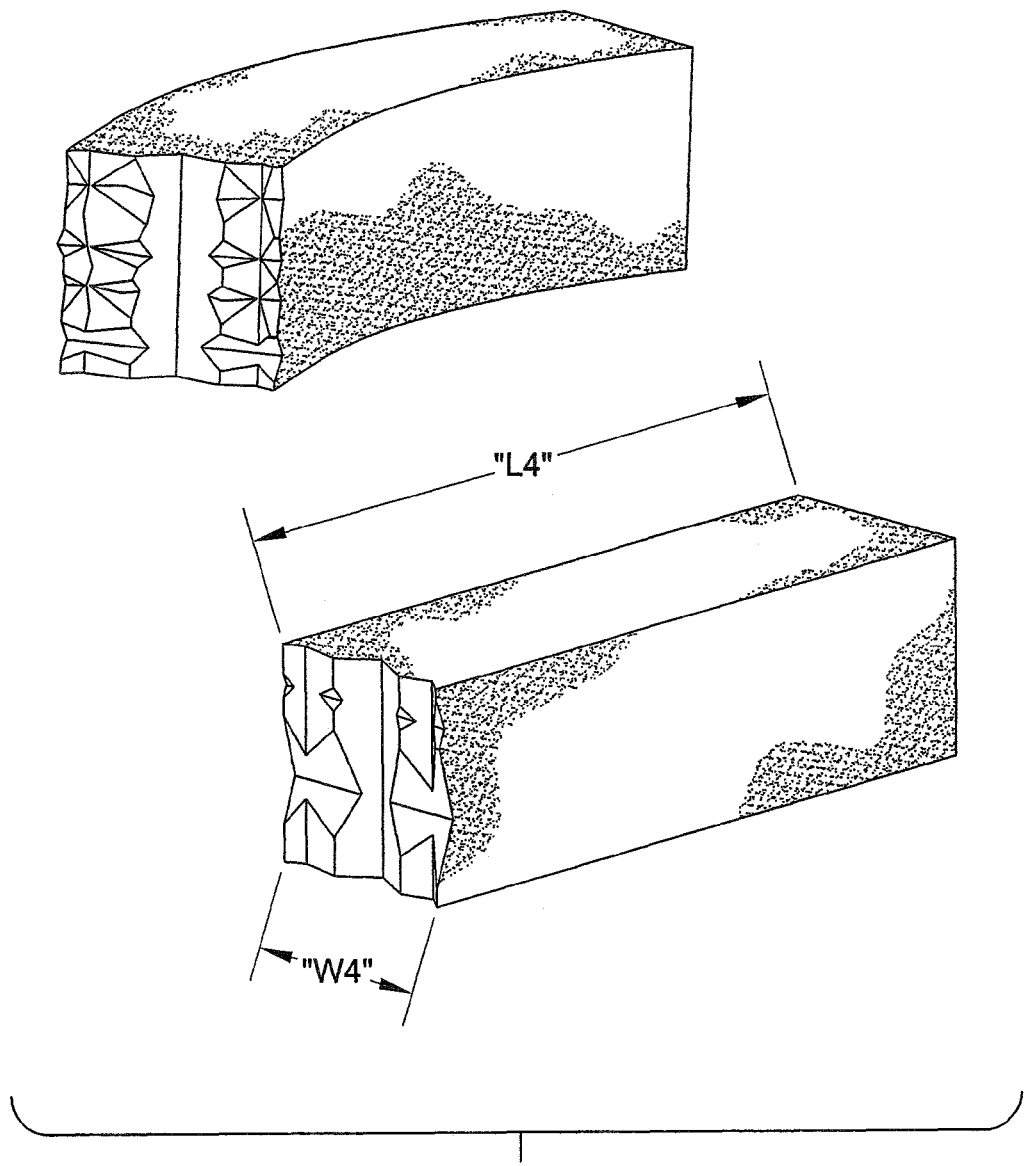
FIG. 4 is an environmental, side view of another embodiment of a solid fuel product, according to the present invention.

Wood chips from a North Carolina wood yard, having already been chipped into approximately ⅛ of an inch square pin chips having a length of less than ½ of an inch were heated and dried to approximately 10% moisture content and then mixed with 4% phenol formaldehyde (PF) powdered resin while the woods chips were still warm. This material was then pelletized into pellets using a roll die pelletizer, such as an Andritz-Sprout 32 LM. The pellets had ¼ of an inch diameter and a length of less than ¼ of an inch. The temperature in the pelletizer was controlled with an AEC hot oil heater or similar heater to maintain a pelletizer die temperature of between 180° C. and 200° C. The output was immediately mixed with still warm "micro-balled" coal at a ratio of 50/50 in a heater/mixer, such as a Bepex "Turbulizer". The heated material was then inserted into the briquette machine to produce briquette cylinders at a pressure of approximately 84,000 psi to manufacture briquette having a length, such as a length L4 of ¾ of an inch and a width, such as W4 of ⅜ of an inch, as illustrated in FIG. 4. The pressed briquettes were then contained within a heated and insulated containment bin where the temperature was controlled to in excess of 50° C. for approximately twenty-four hours.

After this phase of the process, a test of the formulated product indicated a heat value of approximately 11,300 Btu's and a demonstrated 40% reduction in total fuel mercury, sulfur, and nitrogen emissions, see Table.

Example 5

Green wood, such as green wood from a North Caroline wood yard, having a heat value of 4,000 Btu's per pound and a 50% moisture content was used to prepare a solid fuel product having a decreased moisture content so as reduce cold weather handling problems and improve boiler efficiency, as per an end user's specifications.

To prepare the solid fuel product so as to meet the end user's specifications, the green wood was mulched in a suitable wood chipper so as to produce pin chips with a cross sectional dimension of ⅛ of an inch and a length of less than ⅜ of an inch. The chipped wood was then mechanically and chemically dried, such as by using less than 3% lime, to an approximately 10% moisture content. The chipped wood was then discharged and stored in the insulated containment bin where the heat of the insulated containment bin was regulated thermostatically at 110° C., for example.

The chipped wood was then contained within the insulated containment bin for approximately twenty-four hours, after which testing revealed a moisture content of less than 6% and a heat value of approximately 7,700 Btu's per pound.

The output, after being removed from the insulated containment bin, was mixed, such as in any suitable quantity with recycled polystyrene (PS) and urea formaldehyde (UF) resin, such as in a ratio of 80% chipped wood, 18% polystyrene (PS) and 2% urea formaldehyde (UF) resin. This mixture was placed into a roll die pelletizer, such as an Andritz-Sprout 32 LM, where it was heated to approximately 120° C. and released as small "micro-balls". The pelletized mixture was immediately dropped into a briquette roller press to produce a final product so as to manufacture briquettes having a diameter, such as diameter D1 and diameter D2, of one inch and a length, such as length L1 and length L2, of one inch, as illustrated in FIGS. 1A, 1B, and 2.

After the process, a test of this product revealed that the product had a heat value of approximately 10,000 Btu's per pound and less than a 0.5% moisture gain after a twenty-four hour soak in distilled water and less than 0.1% weight loss due to breakage from a fifty foot drop, see Table.

Example 6

Bituminous coal dust having a heat value of 5,500 Btu's per pound, a moisture content of less than 0.5%, as well as a higher than usual ash content indicating a probable contamination with dust from other sources, was used to prepare a solid fuel product having a heat value of approximately 13,300 Btu's per pound, less than a 0.01% moisture gain after a twenty-four hour soak in distilled water, and less than a 0.01% weight loss due to breakage after being dropped from fifty feet, as per an end user's specifications, see Table.

To prepare the solid fuel product so as to meet the end user's specifications, the bituminous coal dust was combined with cooking oil, such as waste cooking oil, and PP from a local source. The ratio of bituminous coal to cooking oil and PP can be any suitable ratio, such as 45%, 20%, or 35%, respectively.

Subsequently, the mixed material was inserted into a plastic heater/mixer where the pressurized temperature was increased to approximately 260° C. The heated mixture was pressurized to just under 3,000 psi and cut into pellets of suitable dimensions.

After the process, a test of the solid fuel product indicated a heat value of approximately 13,300 Btu's per pound, less than a 0.1% moisture gain after a twenty-four hour soak in distilled water, and less than 0.01% weight loss due to breakage after being dropped from fifty feet, see Table.

Example 7

Pet coke breeze having a 9.5% moisture content and a heat value of 14,800 Btu's was used to prepare a solid fuel product having a lower fixed carbon to Btu ratio, a lower sulfur content, and better handling characteristics related to ground water discharge issues, as per an end user's specifications.

To formulate the solid fuel product so as to meet the end user's specifications, the pet coke breeze was chemically dried by mixing the pet coke breeze with less than 3% by weight of Type 1 Portland cement in the mixer. The pet coke breeze was mixed with the Portland cement at high intensity for approximately thirty seconds and then at low intensity for an additional thirty seconds so as to produce the output. The mixer output was then discharged into the heater where the discharge was heated to a suitable temperature, such as approximately 100° C. The product was then discharged and stored in the insulated containment bin, where the heat of the insulated containment bin was regulated by venting thermostatically at 110° C.

The output was contained within the insulated containment bin for approximately twenty-four hours, after which testing revealed a moisture content of less than 3.5% and a heat value of approximately 15,500 Btu's per pound.

The output, after being removed from the insulated containment bin, was mixed with 40% LDPE in the heater/mixer having a pressurized temperature that can reach approximately 210° C. The heated material was then inserted into the plastic injection mold machine or the extruder to manufacture briquette cylinders at a pressure of approximately 4,000 psi so as to manufacture multiple pellets having a diameter, such as diameter D3, of ½ an inch and a diameter, such as diameter D3, of ¾ of an inch, as well as a length, such as length L3, of about an inch, for example, as illustrated in FIG. 3.

After the process, a test of the solid fuel product indicated heat value of approximately 15,300 Btu's per pound, less than a 0.01% moisture gain after a twenty-four hour soak in distilled water, and less than 0.15% weight loss due to breakage resulting from a drop from fifty feet. Further, a calculation of carbon, sulfur, and nitrogen to Btu ratio indicated an improvement of approximately 40% for all three, see Table.

TABLE

| | Coal Fines | Chem Dried Coal | NC Wood Chips | NC Wood Briquette | Example 1 Bit | Example 2 Sub-Bit | Example 3 C&D | Example 4 Section 45 | Example 5 NC Chips | Example 6 Waste Dust | Example 7 Pet Coke |
|---|---|---|---|---|---|---|---|---|---|---|---|
| Moisture (%) | 19.0 | 4.4 | 56.1 | 1.5 | 0.5 | 0.5 | 1.1 | 0.9 | 1.4 | 0.4 | 0.4 |
| Btu | 9,180 | 10,466 | 3,716 | 8,531 | 12,469 | 12,187 | 8,598 | 11,314 | 9,898 | 13,300 | 15,300 |
| HDPE (%) | | | | | 10 | 25 | | | | | |
| LDPE (%) | | | | | | | | | | | 40 |
| PP (%) | | | | | | | | 10 | | 35 | |
| PS (%) | | | | | | | | | 18 | | |
| Other (1) (%) | | | | 2 | | | 2 | 2 | 2 | 20 | |
| Ash (%) | 20.8 | 27.6 | 1.4 | 1.4 | 23.8 | 4.1 | 2.1 | 12.4 | 1.4 | 20.3 | 1.8 |
| Vol Matter (%) | 13.9 | 16.4 | 36.4 | 81.3 | 32.9 | 52.1 | 82.3 | 58.5 | 84.7 | 48.3 | 7.6 |
| Fixed Carbon (%) | 46.3 | 51.6 | 6.2 | 15.9 | 42.7 | 43.3 | 14.1 | 32.0 | 13.4 | 31.1 | 90.2 |
| Nitrogen (%) | 1.1 | 1.3 | 31.2 | 1.1 | 1.1 | 0.7 | 0.9 | 0.8 | 1.1 | .5 | 1.0 |
| Sulfur (%) | 0.5 | 0.6 | .1 | 0.0 | 0.5 | 0.5 | 0.2 | 0.3 | 0 | 0.2 | 0.7 |

It is to be understood that the present invention is not limited to the embodiments described above, but encompasses any and all embodiments within the scope of the following claims.

We claim:

1. A solid fuel product, consisting of:
a solid fuel being a 45% by weight to a 98% by weight of a carbon based;
wherein the carbon based solid fuel includes at least one of coal, petroleum coke, and wood, and
wherein the coal is selected from the group consisting of bituminous coal, anthracite coal, sub-bituminous coal, and lignite coal;
a 1% by weight to a 50% by weight of a plastic material;
wherein the plastic material is selected from the group consisting of a high density polyethylene, a low density polyethylene, a polypropylene, a polystyrene, a polyethylene terephthalate, a polyester, a urea formaldehyde, a melamine urea formaldehyde, a phenol formaldehyde, a melamine-urea-phenol-formaldehyde, a polymeric methylene di-isocyanate, and a styrene monomer; and a 1% by weight to a 5% by weight of a cementitious material, wherein the cementitious material comprises a group consisting of at least one of Portland cement, lime, calcium aluminate cement, natural cement, slag cement, blended cement, cement kiln dust, lime kiln dust, and fly ash.

* * * * *